US 6,697,474 B1

(12) United States Patent
Hanson et al.

(10) Patent No.: US 6,697,474 B1
(45) Date of Patent: Feb. 24, 2004

(54) SYSTEMS AND METHODS FOR RECEIVING TELEPHONE CALLS VIA INSTANT MESSAGING

(75) Inventors: Joel Hanson, Anamosa, IA (US); Mark O'Brien, Hiawatha, IA (US); Tony Moey, North Liberty, IA (US); Mike Kirchner, Cedar Rapids, IA (US); Tom Galvin, Hiawatha, IA (US); Donald J. Maurer, Cedar Rapids, IA (US); Don Fergus, Arlington, VA (US)

(73) Assignee: WorldCom, Inc., Jackson, MS (US)

( * ) Notice: Subject to any disclaimer, the term of this patent is extended or adjusted under 35 U.S.C. 154(b) by 0 days.

(21) Appl. No.: 09/858,256

(22) Filed: May 16, 2001

(51) Int. Cl.[7] .................. H04M 7/00; G06F 15/173
(52) U.S. Cl. ............ 379/201.01; 379/229; 379/221.01; 709/227
(58) Field of Search ................... 379/211.02, 211.01; 709/204–227

(56) References Cited

U.S. PATENT DOCUMENTS

| | | | | |
|---|---|---|---|---|
| 5,805,587 A | * | 9/1998 | Norris et al. | 370/352 |
| 6,078,581 A | * | 6/2000 | Shtivelman et al. | 370/352 |
| 6,144,644 A | * | 11/2000 | Bajzath et al. | 370/259 |
| 6,253,249 B1 | * | 6/2001 | Belzile | 370/259 |
| 6,285,750 B1 | * | 9/2001 | Brachman et al. | 379/207.15 |
| 6,353,611 B1 | * | 3/2002 | Norris et al. | 370/354 |
| 6,389,114 B1 | * | 5/2002 | Dowens et al. | 379/52 |
| 6,493,447 B1 | * | 12/2002 | Goss et al. | 379/265.09 |
| 2001/0034718 A1 | * | 10/2001 | Shaked et al. | 705/64 |
| 2001/0040959 A1 | * | 11/2001 | Garland et al. | 379/243 |
| 2002/0071539 A1 | * | 6/2002 | Diament et al. | 379/202.01 |
| 2002/0073207 A1 | * | 6/2002 | Widger et al. | 709/227 |
| 2002/0076027 A1 | * | 6/2002 | Bernnan et al. | 379/211.01 |
| 2002/0169685 A1 | * | 11/2002 | Joao | 705/26 |

OTHER PUBLICATIONS

"Presence and Instant Communications: Text, voice, video games"; WorldCom; pp. 54–59; Jan. 2001.

* cited by examiner

*Primary Examiner*—Ahmad F. Matar
*Assistant Examiner*—Hector Agdeppa (57) ABSTRACT

A system establishes a telephone call between a calling party and a called party. The system receives a telephone call connection request, including identification of the called party, from the calling party and determines, based on the identification information, if the called party is currently connected to a data network. If the called party is currently connected to the data network, the system establishes the telephone call between the calling party and an instant messaging client of the called party.

25 Claims, 10 Drawing Sheets

| ALIAS FIELD 410 | PIN FIELD 420 | TELEPHONE NO. FIELD 430 | IM USER ID FIELD 440 | IM APPLICATION 445 | IM VERSION FIELD 450 | CURRENT NETWORK ADDRESS FIELD 455 |
|---|---|---|---|---|---|---|
| user1@site1.com | 1121 | 800-555-0000 | 1111111 | AOL | 3.2 | 123.45.67 |
| user2@site2.com | 7254 | 800-555-1111 | 2222222 | YAHOO! | 3.1 | 456.71.23 |
| user3@site3.com | 2285 | 800-555-2222 | 3333333 | HEARME | 4.0 | 712.34.56 |
| user4@site4.com | 9044 | 800-555-3333 | 4444444 | AOL | 5.1 | 345.67.12 |

FIG. 4A

| ALIAS FIELD 460 | TIME FIELD 470 | DATE FIELD 480 | DESTINATION FIELD 490 |
|---|---|---|---|
| user1@site1.com | 9:00am-5:00pm | monday-friday | cell phone # |
| user1@site1.com | 5:00pm-9:00am | monday-friday | home # |
| user1@site1.com | 9:00am-5:00pm | saturday-sunday | cell phone # |
| user1@site1.com | 5:00pm-9:00am | saturday-sunday | home # |
| ... | ... | ... | ... |

SYSTEMS AND METHODS FOR RECEIVING TELEPHONE CALLS VIA INSTANT MESSAGING

FIELD OF THE INVENTION

The present invention relates generally to telecommunication systems and, more particularly, to systems and methods for receiving telephones calls via instant messaging.

BACKGROUND OF THE INVENTION

The explosion in the number of communication devices operating over public switched telephone networks has increased the costs of telecommunications because the additional devices require extra phone lines, phone numbers, and even new area code additions, which are costly. These added costs adversely effect consumers, businesses and the general public.

On the other hand, the increasing access to, and connections to data networks, such as the Internet, presents an affordable means for maintaining near constant communications with clients, colleagues, and family members. In addition, the convergence of voice and data traffic should move in such a way that the transfer of data between public switched telephone networks and data networks, such as the Internet, becomes more transparent to the consumer and more economical to use.

While the transmission of voice-to-voice communications over data networks is now possible, communications between the public switched telephone network and data networks is still not seamless. For example, while current instant messaging services allow for voice communications connected directly to data networks, telephone calls that originate from a calling party using a public switched telephone network to a called party connected to a data network with an instant messaging client, for example, does not exist. Several examples may clarify the problems that currently exist for the consumer.

Suppose, for example, that a typical private consumer in the home has a single telephone line into the house. When that telephone line is being used, no other incoming telephone calls can be accepted by any member of the household. It would be useful if the consumer's Internet connection could also be used to receive incoming calls from the public switched telephone network and act as a virtual second telephone line, without paying for the expense of having a second hardwired telephone line.

Similarly, suppose that a business would like its employees to have the ability to receive incoming telephone calls while away from the office, or in lieu of a second telephone line to his/her desk when connected to its employer's data network. One solution may be to provide every employee with a cellular phone, however, the costs would be prohibitive. Since many employees have laptop computers for use away from the office, it would be cost effective and efficient if the employee could use his/her connection to the Internet or corporate network to accept incoming telephone calls from the public switched telephone network via their instant messaging client.

Accordingly, there is a need for systems and methods to provide voice communications originating on a public switched telephone network to a called party connected to a data network via an instant messaging client.

SUMMARY OF THE INVENTION

Systems and methods consistent with the present invention address this and other needs by providing a mechanism through which a user may receive a telephone call placed over a public switched telephone network via his/her instant messaging client. Use of a personal computer, laptop computer, personal digital assistant, or a similar device for receiving incoming telephone calls effectively serves as a virtual second telephone line.

In accordance with the purpose of this invention as embodied and broadly described herein, a system establishes a telephone call between a calling party and a called party. The system receives a telephone call connection request, including identification information specific to the called party, from the calling party and determines, based on the identification information, if the called party is currently connected to a data network. If the called party is currently connected to the data network, the system establishes the telephone call between the calling party and an instant messaging client associated with the called party.

In another implementation consistent with the present invention, a method for routing a telephone call from a calling party to a called party includes receiving a telephone call connection request, including identification of the called party, from a calling party, determining if the called party is available on a network, obtaining, based on the identification information, an instant messaging user identification of the called party, and routing the telephone call to the called party based on the instant messaging user identification.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Instead, the scope of the invention is defined by the appended claims.

Implementations consistent with the present invention provide a mechanism through which a user may receive a telephone call from a public switched telephone network via his/her instant messaging client. The user does not need to disconnect from his/her Internet service provider or intranet connection to accept the inbound call.

EXEMPLARY SYSTEM CONFIGURATION

Figure 1:
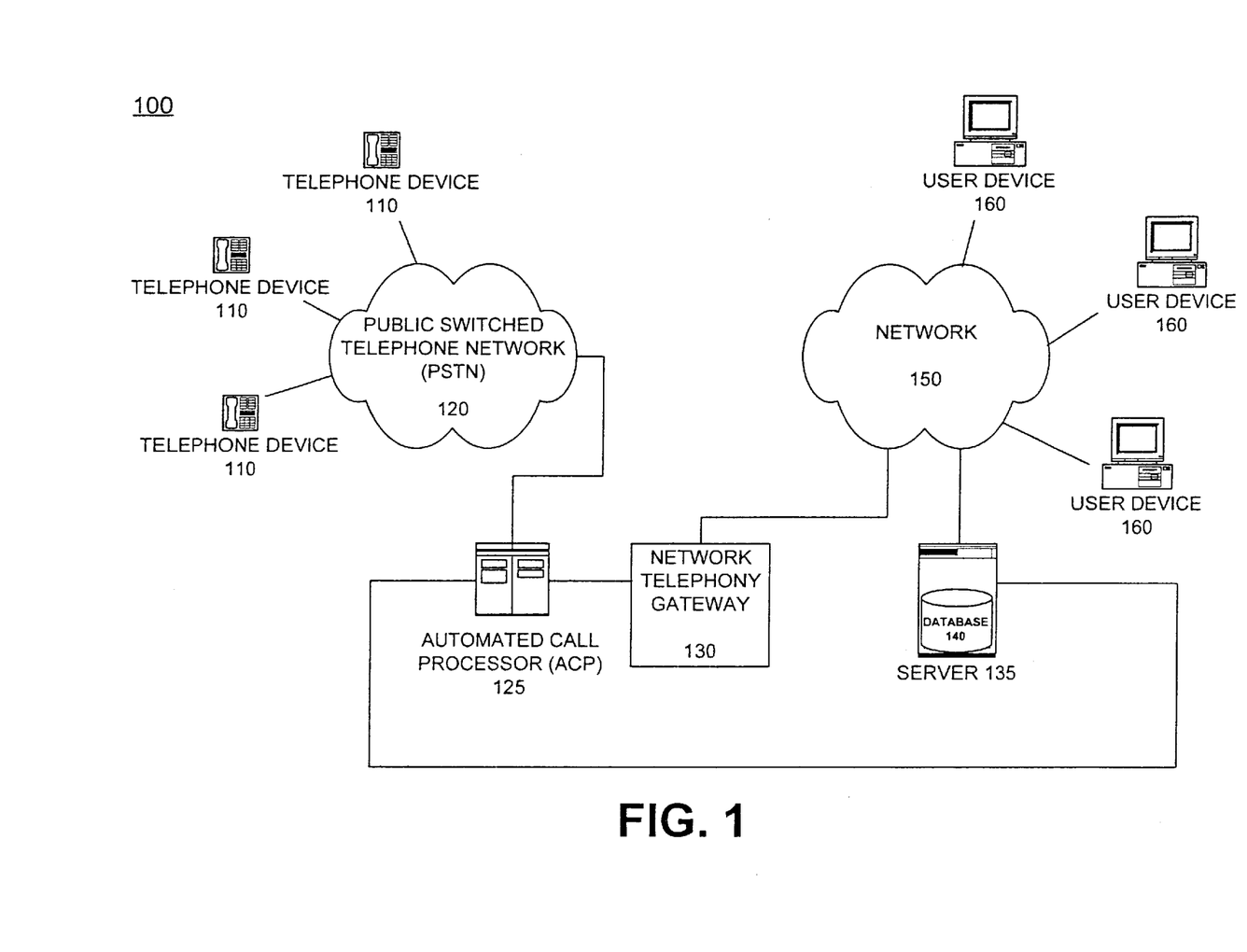
FIG. 1 illustrates an exemplary network in which systems and methods consistent with the present invention may be implemented.

FIG. 1 illustrates an exemplary system 100 in which systems and methods, consistent with the present invention, may be implemented. As illustrated, the exemplary system 100 includes several telephone devices 110 connected to a PSTN 120, and several user devices 160 connected to a network 150. PSTN 120 and network 150 may be connected through an ACP 125 and a network telephony gateway 130. A server 135 may contain a database 140, and may connect with network 150 and ACP 125. It will be appreciated that a typical system could include more or fewer devices than are shown in FIG. 1. In addition, it will also be appreciated that system 100 may include additional devices not shown that aid in the receiving, transmitting, or processing of data.

The telephone device 110 may consist of any device that can receive, process, and transmit voice data, such as a plain old telephone system (POTS) telephone, a cellular phone, or any other analog/digital wireless or wireline communication device. The telephone device 110 may communicate through PSTN 120. PSTN 120 may include any public switched telecommunications network that receives, processes, and transmits voice or data through various transmission media.

The network 150 may include one or more conventional data networks, such as the Internet, an intranet, a wide area network (WAN), a local area network (LAN), or other similar types of networks. The network telephony gateway 130 may include one or more devices for converting analog and/or digital voice data to packet-based data and vice versa for communication between two or more parties in system 100 in a well-known manner.

The ACP 125 may include any type of computer system, such as a mainframe, minicomputer, or personal computer, capable of connecting to the PSTN 120 and the network telephony gateway 130 to enable the telephone devices 110 to communicate with the user devices 160. In alternative implementations, the ACP 125 may include a mechanism for directly connecting to one or more user devices 160 or may be included within a user device 160. The ACP 125 may transmit and/or receive data via a wired, wireless, optical, or any other connection. In another alternate implementation consistent with the present invention, the functions of the ACP 125 may be performed manually by an operator.

The server 135 may consist of any type of computer system, such as a mainframe, minicomputer, personal computer, or other processing equipment capable of connecting to the network 150 and the ACP 125 to facilitate communication between the telephone devices 110 and the user devices 160. The server 135 may contain an associated database 140 that contains user profile information and other information associated with facilitating communications between the PSTN 120 and the user device 160. Alternately, the database 140 may be located outside of the server 135, such as in a user device 160 or elsewhere on the network 150.

The user device 160 may consist of any type of computer system, such as a mainframe computer, minicomputer, personal computer, laptop, personal digital assistant, and the like, capable of connecting to the network 150. User device 160 may connect to network 150 in any conventional manner, such as via a wired, wireless, or optical connection.

EXEMPLARY AUTOMATED CALL PROCESSOR

Figure 2:
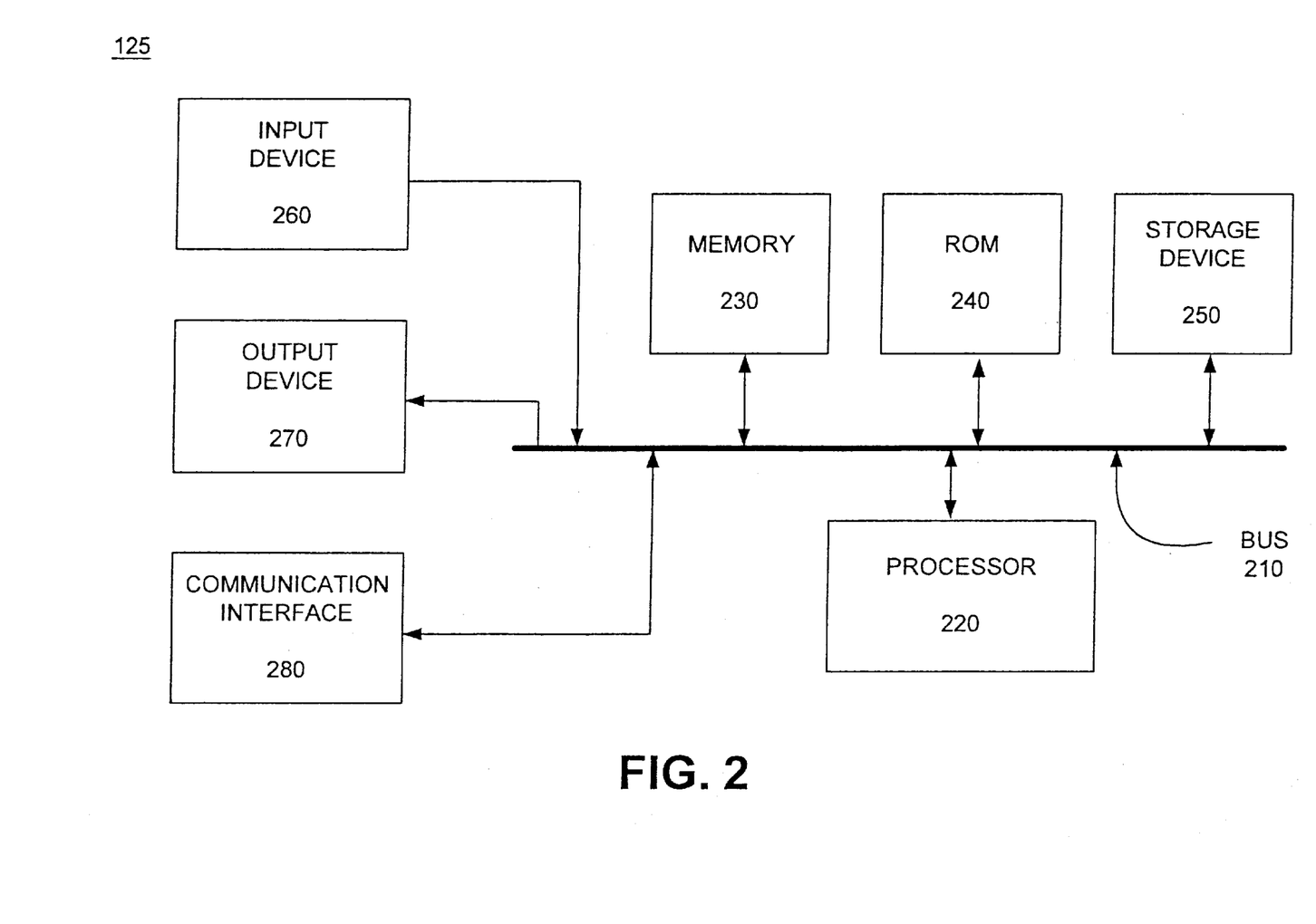
FIG. 2 illustrates an exemplary configuration consistent with the present invention of the automated call processor (ACP) of FIG. 1.

FIG. 2 illustrates an exemplary ACP 125 consistent with the present invention. In FIG. 2, the ACP 125 includes a bus 210, a processor 220, a memory 230, a read only memory (ROM) 240, a storage device 250, an input device 260, an output device 270, and a communication interface 280. The bus 210 may include one or more conventional buses that permit communication among the components of the ACP 125.

The processor 220 may include any type of conventional processor or microprocessor that interprets and executes instructions. The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism that permits an operator to input information to the ACP 125, such as a keyboard, a mouse, a microphone, a pen, a voice recognition device, another biometric input device, etc. The output device 270 may include any conventional mechanism that outputs information to the operator, including a display, a printer, a speaker, etc.

The communication interface 280 may include any transceiver-like mechanism that enables the ACP 125 to communicate with other devices and/or systems, such the server 135 or the network telephony gateway 130. For example, the communication interface 280 may include a modem or an Ethernet interface to a network. Alternatively, communication interface 280 may include other mechanisms for communicating via a data network.

The ACP 125 acts in response to the processor 220 executing sequences of instructions contained in the memory 230. Such instructions may be read into the memory 230 from another computer-readable medium (a computer-readable medium may include one or more memory devices or carrier waves), such as a storage device 250, or from a separate device via the communication interface 280. Execution of the sequences of instructions contained in the memory 230 causes the processor 220 to perform the acts that will be described hereafter. In alternative embodiments, hardwired circuitry may be used in place of or in combination with software instructions to implement the present invention. Thus, the present invention is not limited to any specific combination of hardware circuitry and software.

EXEMPLARY SERVER

Figure 3:
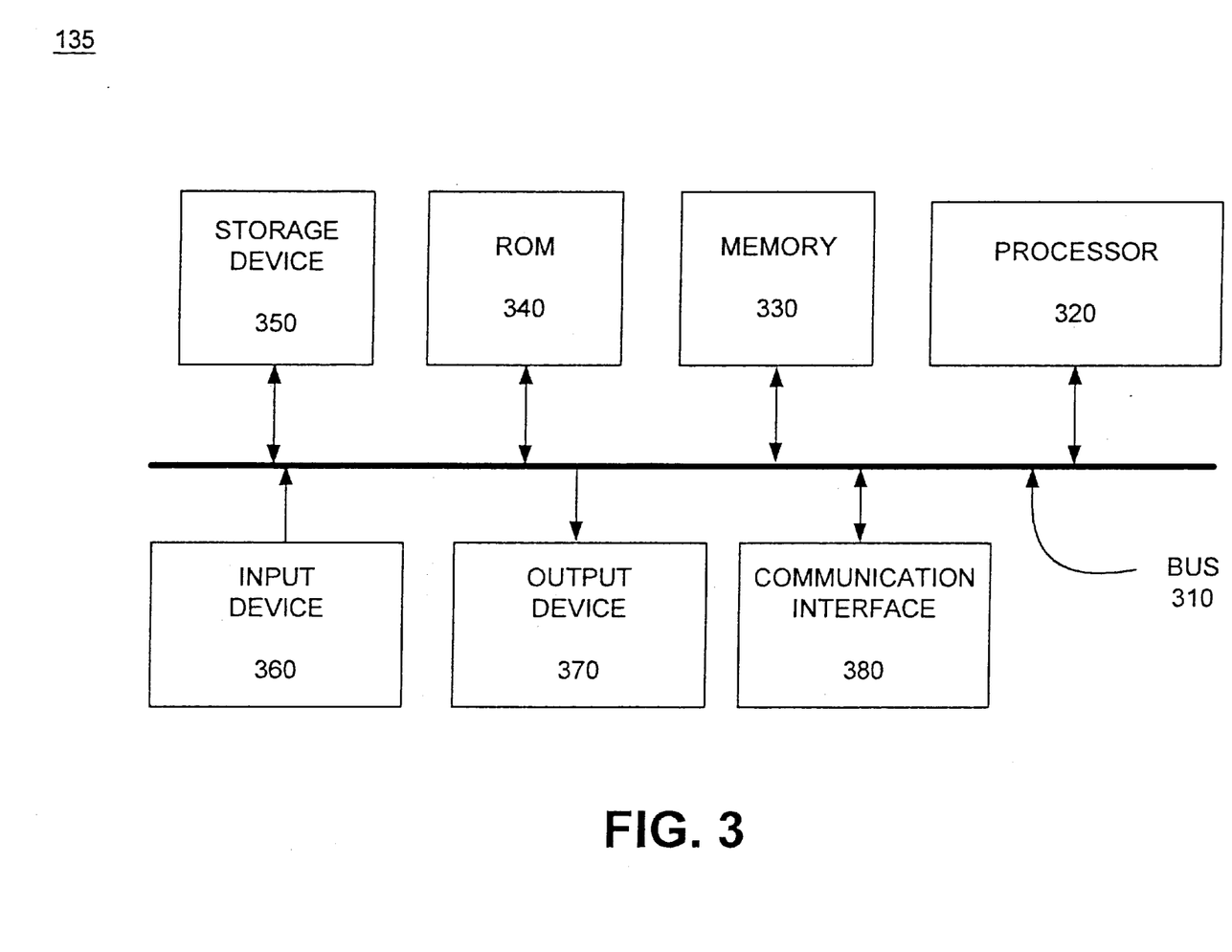
FIG. 3 illustrates an exemplary configuration consistent with the present invention of the server of FIG. 1.

FIG. 3 illustrates an exemplary server 135 consistent with the present invention. In FIG. 3, the server 135 includes a bus 310, a processor 320, a memory 330; a ROM 340, a storage device 350, an input device 360, an output device 370, and a communication interface 380. The bus 310 may include one or more conventional buses that permit communication among the components of the server 135.

The processor 320 may include any type of conventional processor or microprocessor that interprets and executes instructions. The memory 330 may include a RAM or another type of dynamic storage device that stores information and instructions for execution by the processor 320. The memory 330 may also be used to store temporary variables or other intermediate information during execution of instructions by the processor 320.

The ROM 340 may include a conventional ROM device and/or another type of static storage device that stores static information and instructions for the processor 320. The storage device 350 may include a magnetic disk or optical disk and its corresponding drive and/or some other type of magnetic or optical recording medium and its corresponding drive for storing information and/or instructions.

The input device 360 may include any conventional mechanism that permits an operator to input information to the server 135, such as a keyboard, a mouse, a microphone, a pen, a voice recognition device, another biometric input device, etc. The output device 370 may include any conventional mechanism that outputs information to the operator, including a display, a printer, a speaker, etc.

The communication interface 380 may include any transceiver-like mechanism that enables the server 135 to communicate with other devices and/or systems, such as a user device 160. For example, the communication interface 380 may include a modem or an Ethernet interface to a network. Alternatively, the communication interface 380 may include other mechanisms for communicating via a data network, such as the network 150.

The server 135 acts in response to processor 320 executing sequences of instructions contained in the memory 330. Such instructions may be read into the memory 330 from another computer-readable medium, such as a storage device 350, or from a separate device via the communication interface 380. Execution of the sequences of instructions contained in the memory 330 causes the processor 320 to perform the acts that will be described hereafter. In alternative embodiments, hardwired circuitry may be used in place of or in combination with software instructions to implement the present invention. Thus, the present invention is not limited to any specific combination of hardware circuitry and software.

A server 135, consistent with the present invention, may provide information to the user device 160 from an associated database, such as the database 140.

Figure 4A:
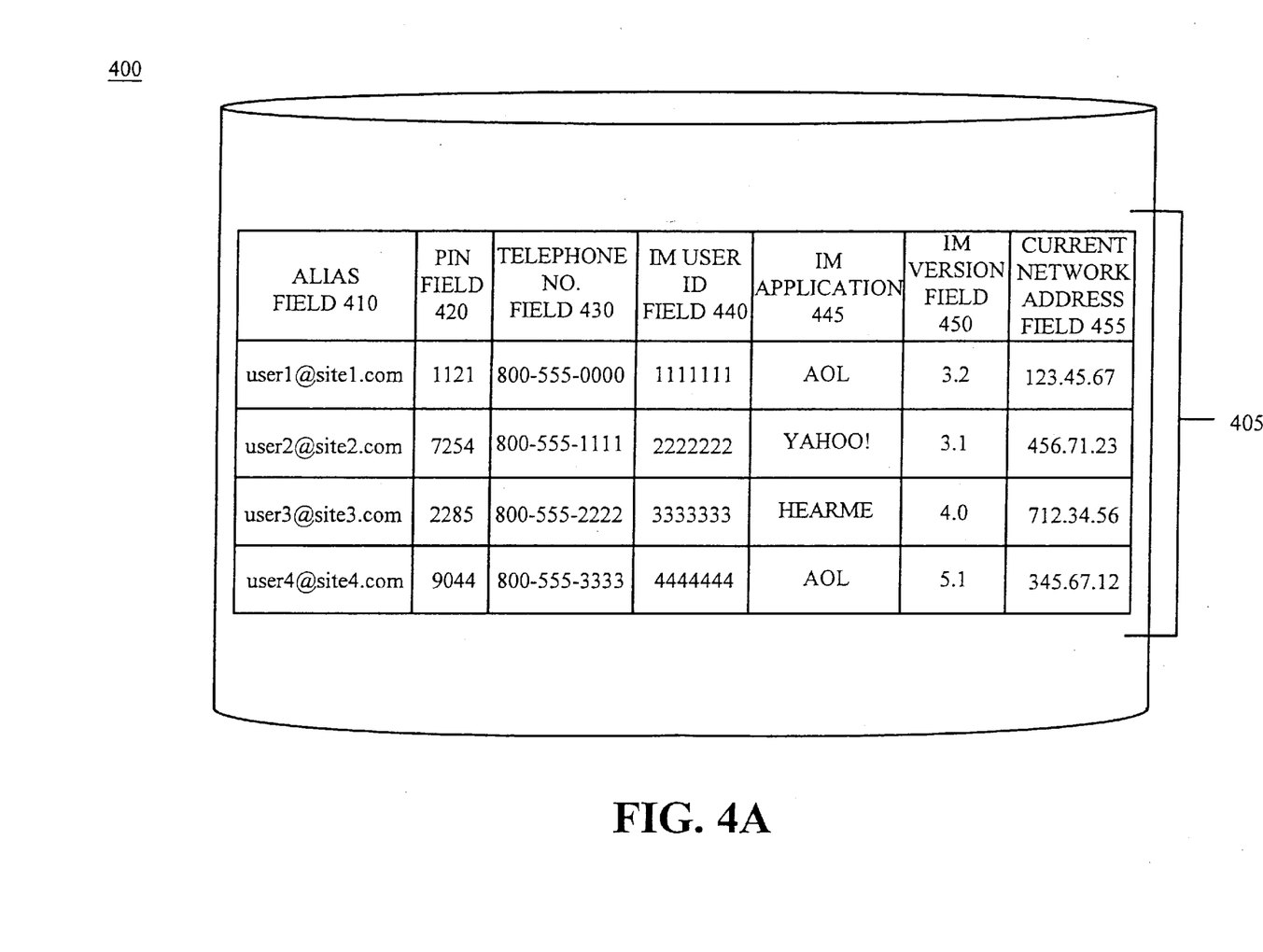
FIGS. 4A–4B illustrate an exemplary configuration of the database of FIG. 1, consistent with the present invention.
Figure 4B:
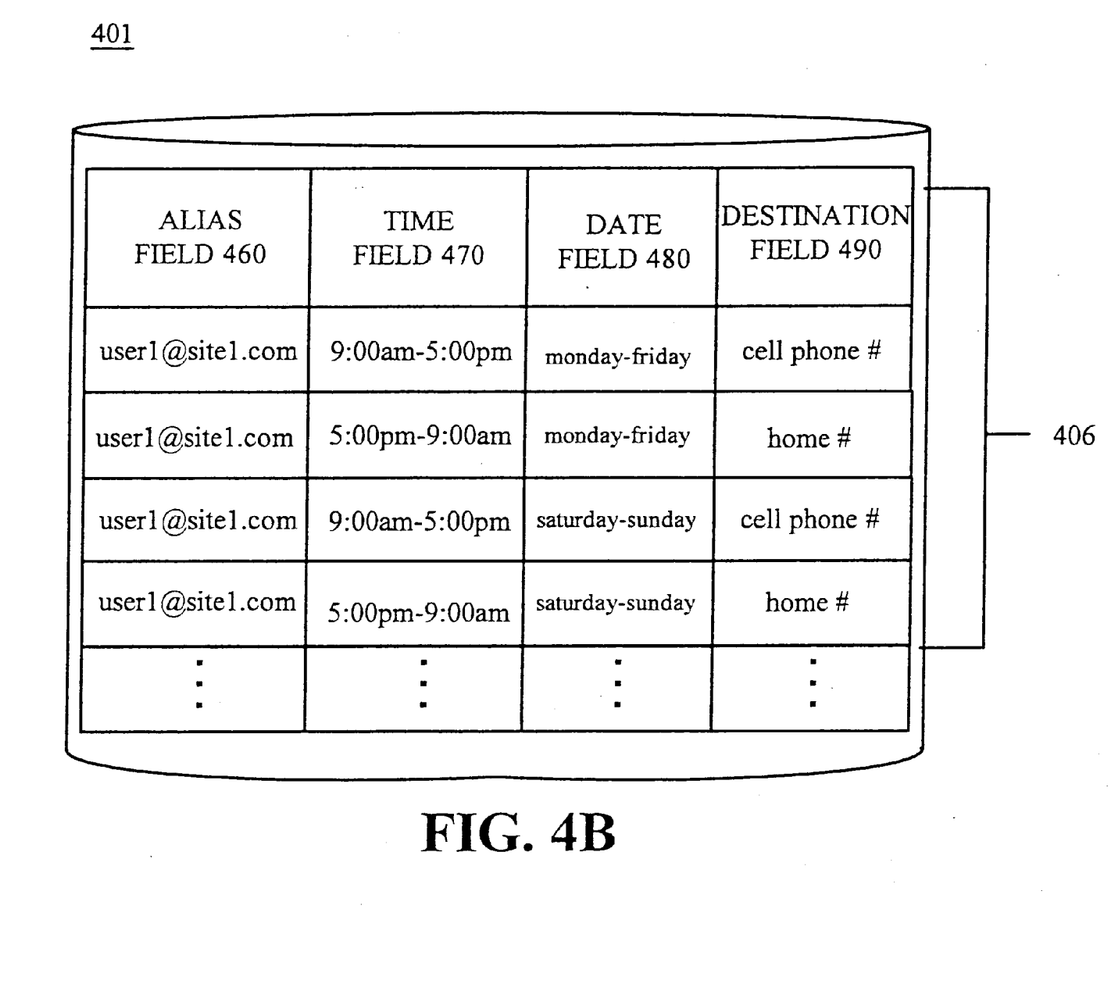

FIG. 4A and FIG. 4B illustrate two exemplary databases 400 and 401, consistent with the present invention, that may be included within the database 140. While only one of each database is described below, it will be appreciated that the databases 400 and 401 may each consist of multiple databases stored locally at the server 135, or stored at different locations throughout the network 150.

As illustrated in FIG. 4A, the database 400 includes a group of entries 405. Each entry 405 includes information stored in one or more of the following exemplary fields: an alias field 410, a personal identification number (PIN) field 420, a telephone number field 430, an instant messaging (IM) user identification (ID) field 440, an IM application field 445, an IM version field 450, and a current network address field 455. The database 400 may contain additional fields (not shown) that aid the server 135 in searching/sorting data in the database 400.

The alias field 410 may store a name or identifier that uniquely identifies a user. As illustrated in FIG. 4A, for example, the alias field 410 may store the unique e-mail addresses of users in the network 150.

The PIN field 420 may contain a unique PIN associated with each user identified in alias field 410. It will be appreciated that a PIN may or may not be necessary for identifying a user. For example, if a group of users are available at the same telephone number, a PIN may be needed to differentiate between the different users. The telephone number field 430 may contain a telephone number associated with the user of user device 160 that routes a telephone call to the ACP 125. The ACP 125 may identify the user based on the telephone number in the telephone number field 430.

The IM user ID field 440 may store a user ID that uniquely identifies the user to his/her instant messaging service provider. The IM user ID field 440 may contain an alphanumeric sequence of characters. The IM application field 445 may store an indication of the type of instant messaging application (e.g., America Online, Yahoo!, etc.) used by the user. The IM version field 450 may contain the user's instant messaging client version number. The current network address field 455 may store an address assigned to the user for a current network session. In an implementation consistent with the present invention, the network address may be an Internet protocol (IP) address. It will be appreciated that the user's IP address may, for example, be different each time that he or she logs on to his/her Internet service provider (ISP) or intranet connection.

As illustrated in FIG. 4B, the database 401 may include a group of entries 406 associated with the following exemplary fields: an alias field 460, a time field 470, a date field 480, and a destination field 490. The database 401 may contain additional fields (not shown) that aid the server 135 in searching/sorting data in the database 401.

The alias field 410 may store a name or identifier that uniquely identifies a user. As illustrated in FIG. 4B, for example, the alias field 460 may store a unique e-mail address of a user. The time field 470 may store data identifying one or more time periods. The date field 480 may store information identifying a date or range of dates. The destination field 490 may store information identifying how the user is to be contacted. For example, the destination field 490 may indicate that a user is to be contacted via instant messaging or via a telephone number associated with a user's various communication devices, such as a cellular telephone number, a home telephone number, and so on. As will be described in more detail below, the ACP 125 may use the information in the database 140 to determine, at any particular time, how to contact the user.

EXEMPLARY USER DEVICE

Figure 5:
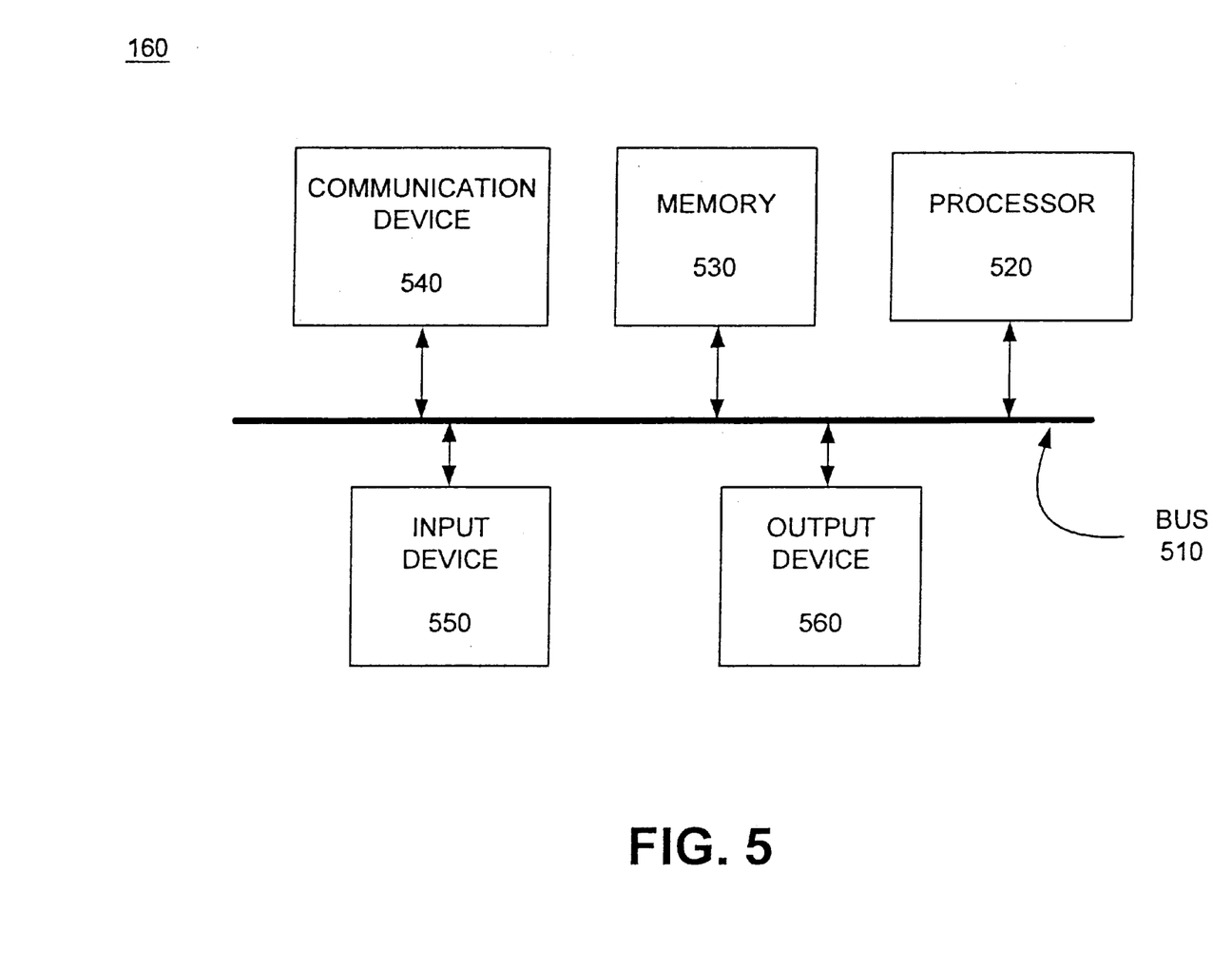
FIG. 5 illustrates an exemplary configuration consistent with the present invention of a user device of FIG. 1.

FIG. 5 illustrates an exemplary user device 160 consistent with the present invention. The user device 160 includes a bus 510, a processor 520, a memory 530, a communication device 540, an input device 550, and an output device 560. The bus 510 may include one or more conventional buses that permit communication among the components of the user device 160.

The processor 520 may include any type of conventional processor or microprocessor that interprets and executes instructions. The memory 530 may include a RAM or another type of dynamic storage device that stores information and instructions for execution by the processor 520; a ROM or another type of static storage device that stores static information and instructions for use by the processor 520; and/or some other type of magnetic or optical recording medium and its corresponding drive.

The communication device 540 may include any transceiver-like mechanism that enables the user device 160 to communicate with other devices and/or systems. For example, the communication device 540 may include mechanisms for communicating with other devices, such as other user devices 160, the ACP 125, or the server 135 via a network, such as network 150 (FIG. 1).

The input device 550 may include any conventional mechanism that permits a user to input information to user device 160, such as a keyboard, a mouse, a pen, a voice recognition device, other biometric input devices, and the like. The output device 560 may include any conventional mechanism that outputs information to the user, including a display, a printer, a speaker, etc.

Execution of the sequences of instructions contained in memory 530 causes processor 520 to perform the functions described hereafter. In alternative embodiments, hardwired circuitry may be used in place of or in combination with software instructions to implement the present invention. Thus, the present invention is not limited to any specific combination of hardware circuitry and software.

EXEMPLARY PROCESS FOR RECEIVING

Initial User Profile Information

Figure 6:
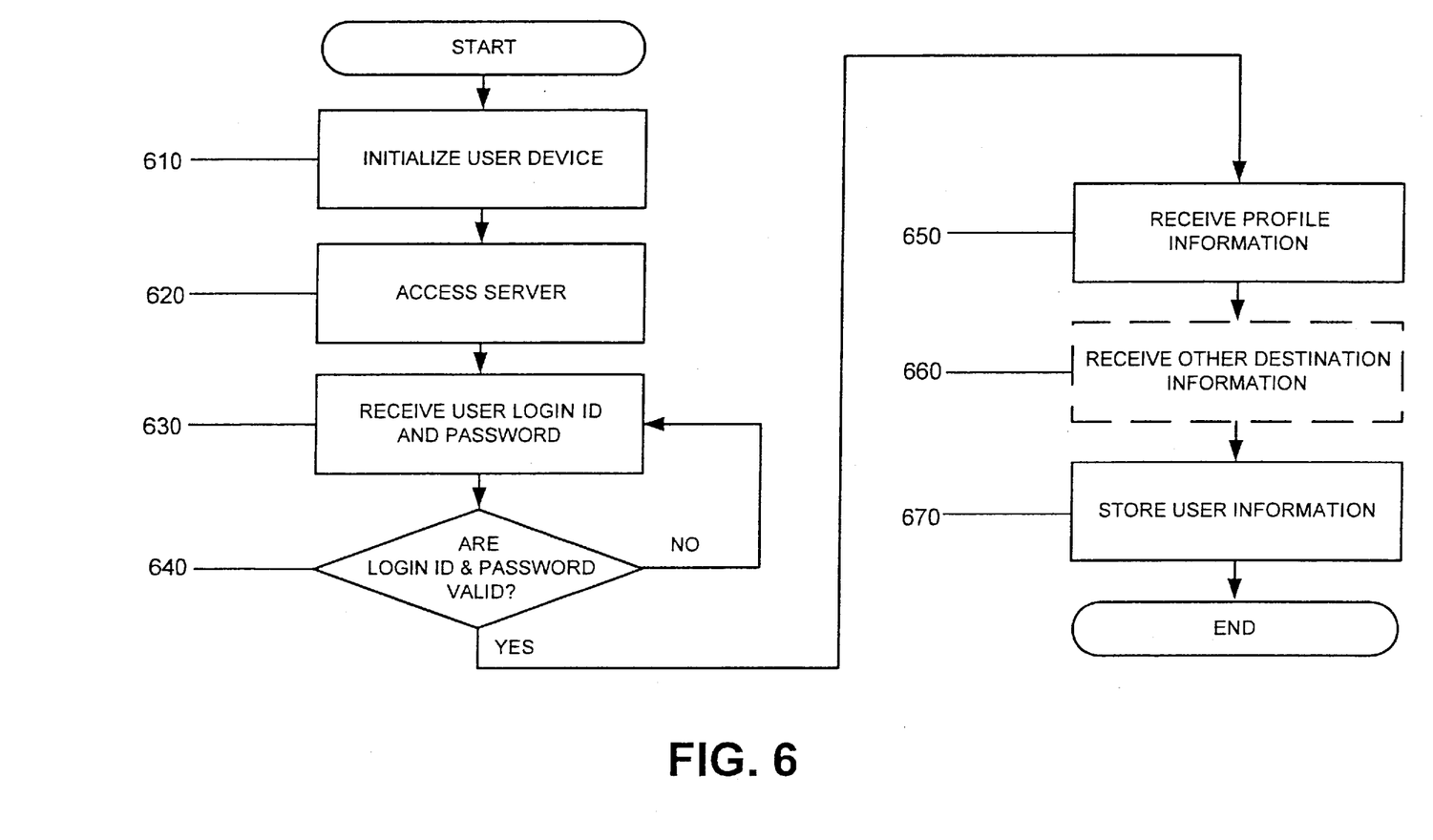
FIG. 6 illustrates exemplary processing for receiving user profile information.

FIG. 6 illustrates exemplary processing, consistent with the present invention, for receiving profile information from a system user. Processing may begin with the initialization of a user device 160 [act 610]. Initialization may include powering up the user device 160 and performing a boot-up process. The user may then access a graphical user interface (GUI) that will allow the user to navigate through various web pages available on network 150 by entering a Uniform Resource Locator (URL) address [act 620]. For example, the user may enter a URL associated with the server 135. The user may be prompted to enter unique personal identifiers before access to the server 135 is authorized.

After receiving a personal login identifier (ID) and associated password [act 630], the server 135 may determine whether the login ID and password are valid [act 640]. The login ID and password may each consist of alphanumeric characters of a specified length that are entered into the user device 160 through key strokes or manipulation of the mouse, for example. The login ID and password may, for example, have previously been provided to the user. In other implementations, the login ID and/or password may consist of voice recognition or another biometric mechanism to authenticate the user. If the login ID and associated password are not valid, the user may be asked to reenter them. The user may, for example, be given three attempts to successfully complete the login process before being ejected from the system. If the login ID and password are valid, the user may be permitted access to the server 135.

The user may then interact with the server 135 through a GUI to provide the necessary profile-type information for storage [act 650]. The necessary profile information may include an optional PIN, an e-mail address, an instant messaging user ID, an instant messaging version number, and any other information necessary to locate, uniquely identify, and/or communicate with the user. The user may enter this information through the input device 550 (FIG. 5), for example, to the appropriate fields on a GUI designed to receive user profile information.

The server 135 may then receive other optional user data destination information that may allow a caller to reach the user if he/she is unavailable through the network 150 [act 660]. This optional information may include a home telephone number, a cellular telephone number, etc. The server 135 may also receive scheduling information that identifies particular times and/or dates at which the user may be contacted at a particular data destination.

The server 135 may then store all user provided information in memory [act 670]. The server 135 may also store a current network address (e.g., a current Internet protocol (IP) address) associated with the user device 160. The server 135 may, for example, store the provided information in database 400 and/or database 401.

EXEMPLARY PROCESS FOR TRANSMISSION OF COMMUNICATIONS

Figure 7:
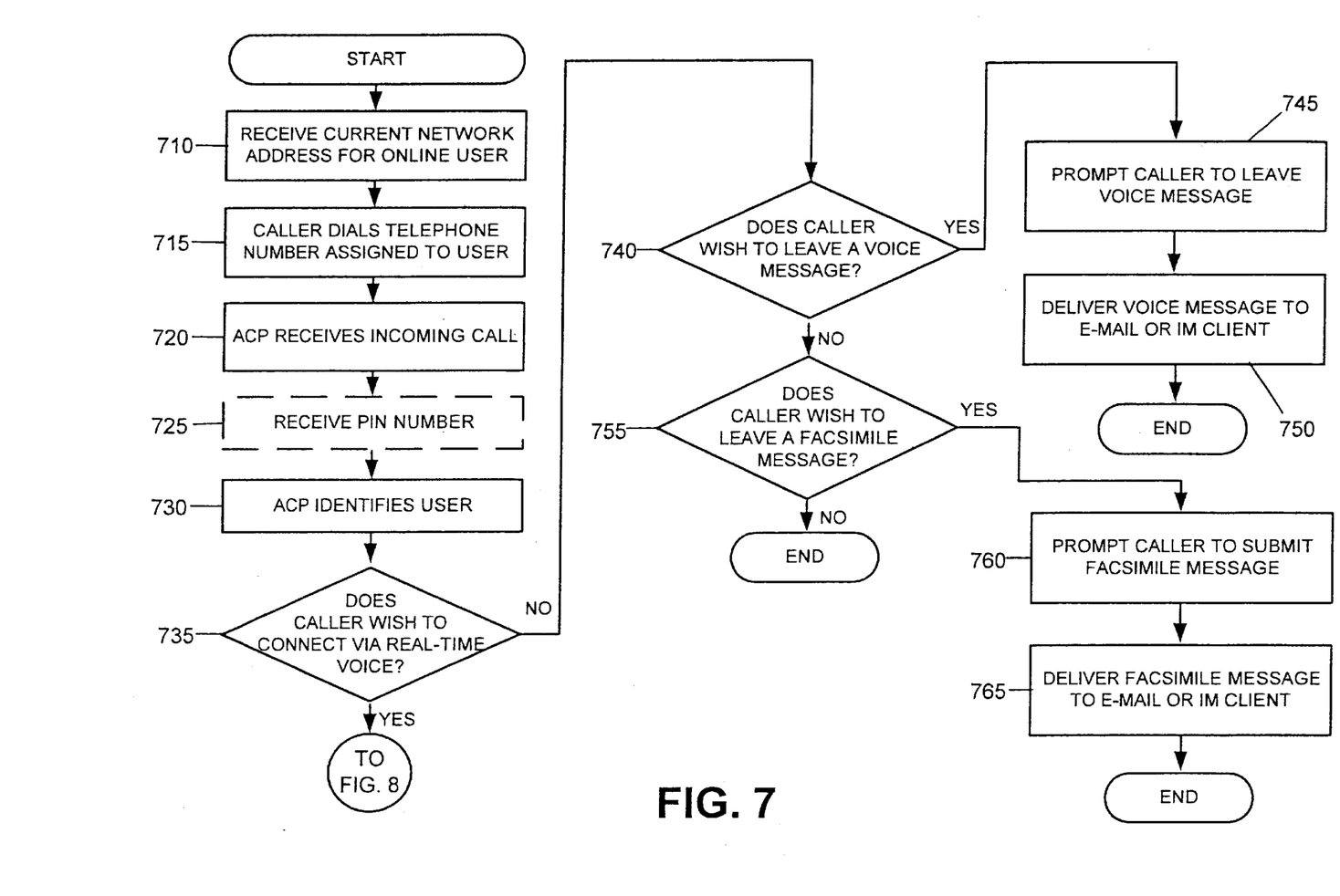
FIG. 7 illustrates exemplary processing for receiving a caller's request to communicate with a user.
Figure 8:
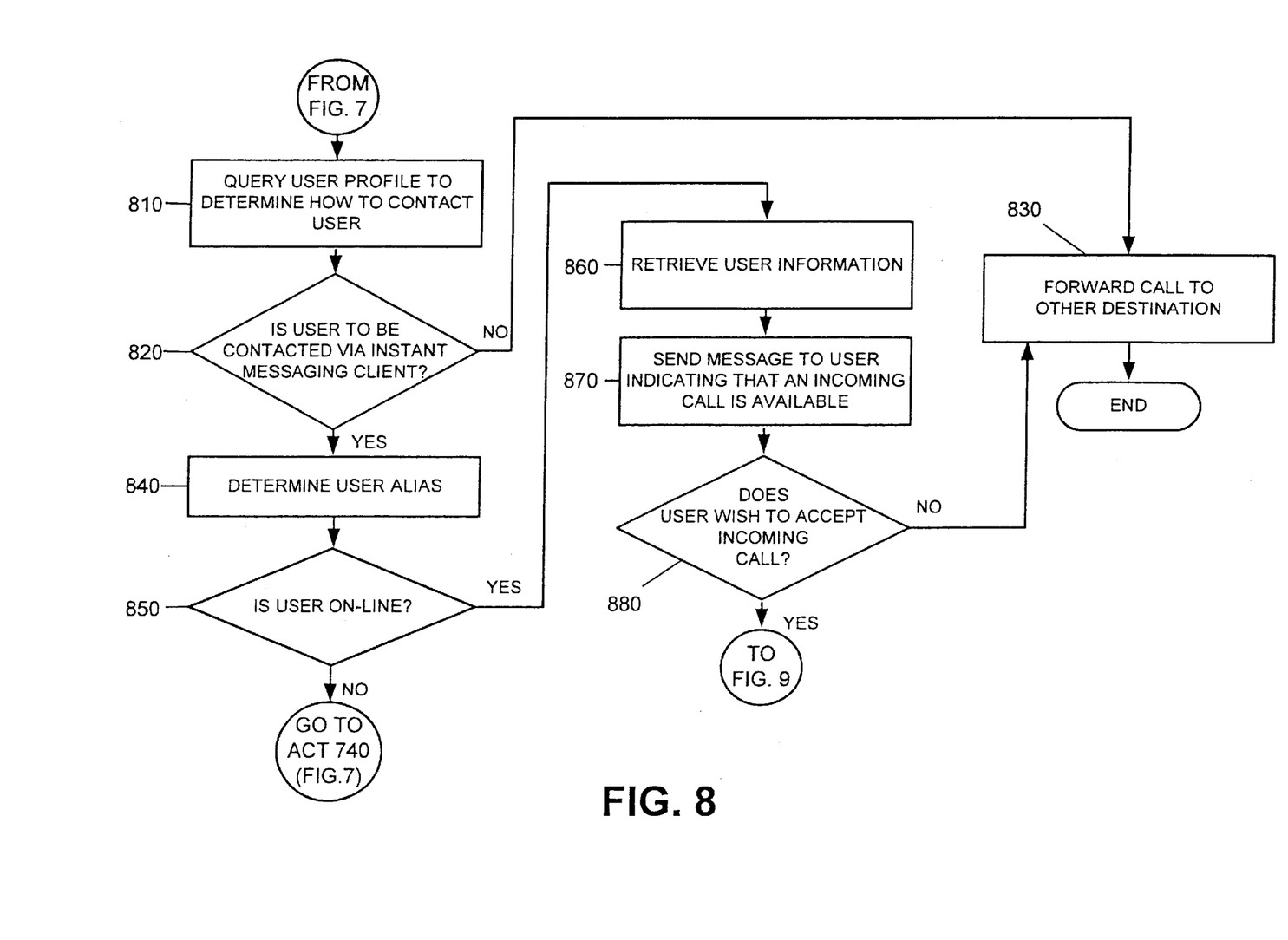
FIG. 8 illustrates exemplary processing for contacting a user and determining his/her desire to accept a voice communication.
Figure 9:
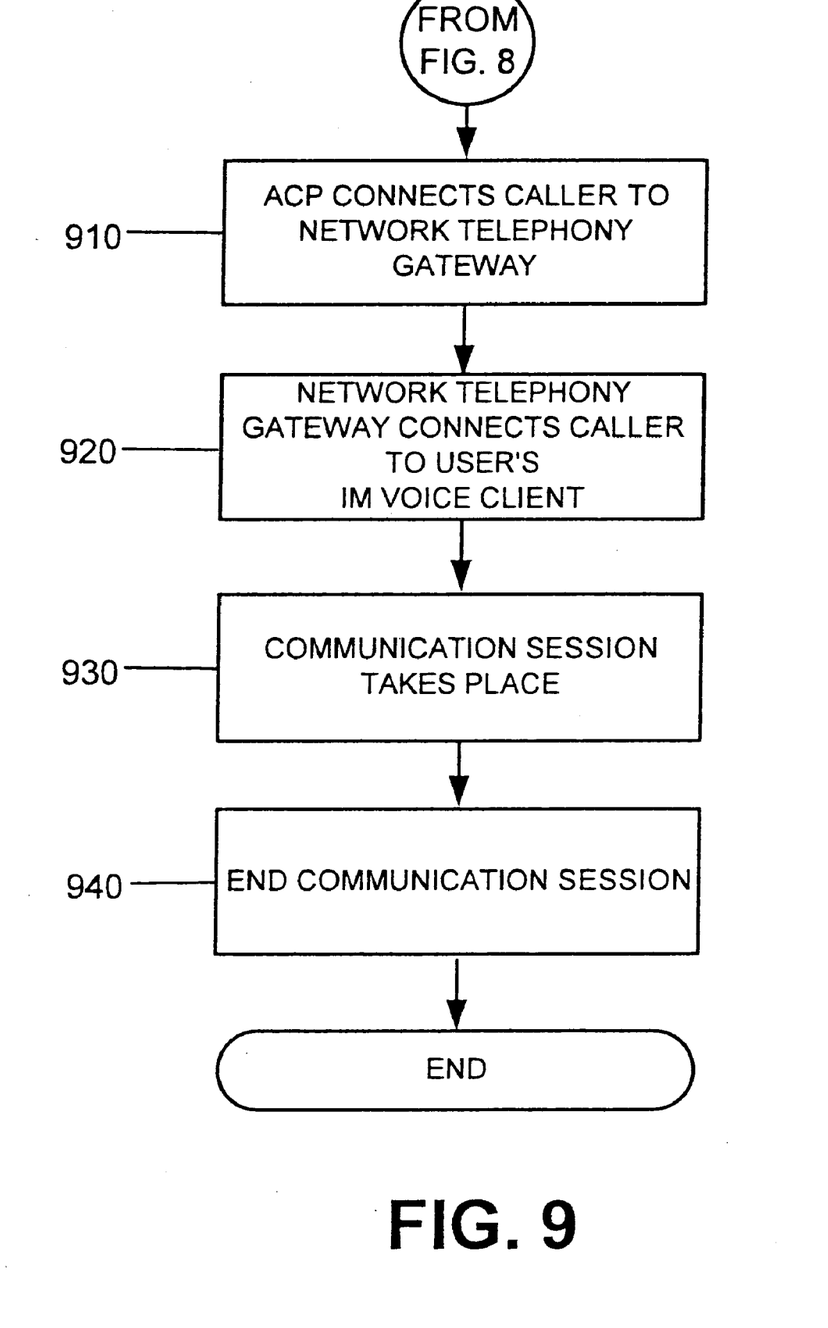
FIG. 9 illustrates exemplary processing for connecting the caller and the user.

FIGS. 7–9 illustrate exemplary processing, consistent with the present invention, for receiving a telephone call from the PSTN 120 via a user's instant messaging client. Processing may begin with the server 135 receiving the current network address (e.g., current IP address) of the online user [act 710]. Each time that a new network connection is established, the user may access the server 135 and the associated database 140 through the network 150 with the user device 160. The user may submit a user identification (ID) number and password to gain authorization for access. The server 135 may receive the current network address from the user, associate that current network address with the user alias, and store the current network address in the database 140.

Once the user has registered, assume that a caller dials the telephone number associated with the user [act 715]. The incoming telephone call may be routed to the ACP 125 in a conventional manner [act 720]. The ACP 125 may receive the incoming telephone call from the PSTN 120. If a user associated PIN is required, the caller may then be prompted by the ACP 125 to input the PIN corresponding to the specific user with which the caller wishes to communicate. If a PIN is required, the ACP 125 may receive the PIN from the caller [act 725].

The ACP 125 may identify the user with whom the caller wishes to communicate [act 730]. The ACP 125 may access the database 140 and use the telephone number dialed by the caller and/or the PIN supplied by the caller to identify the user. The ACP 125 may then prompt the caller to answer the question "Do you wish to talk to the user?" [act 735]. The ACP 125 may use an interactive voice response function to communicate with the caller with a voice menu that allows the caller to make choices and enter information via the keypad of a telephone device 110, for example. The caller may, for example, be asked to press the number "one" on the keypad of the telephone device 110 if the answer is yes, or press the number "nine" if the answer is no.

If the caller answers with a negative response, for example, by pressing the number "nine" on the telephone device 110, then the ACP 125 may prompt the caller with a question, such as "Do you wish to leave a voice message for the user?" [act 740]. If the answer is yes, the ACP 125 may prompt the caller to speak the message into the telephone device 110 for recording [act 745]. This voice message may be temporarily stored as an audio file in memory 230 (FIG. 2), for example.

The ACP 125 may deliver the voice message to the user's e-mail address or as an instant message via the user's instant messaging client [act 750]. The ACP 125 may, for example, query the database 400 and/or 401 to get delivery instructions and deliver the voice message to the user's instant messaging client if the user is currently online. If the user is determined not to be currently online, then the ACP 125 may deliver the voice message as an email attachment sent to the user's e-mail address.

If the caller indicates that he/she does not wish to leave a voice message for the user, the ACP 125 may prompt the caller to answer the question "Do you wish to leave a facsimile message for the user?" [act 755]. If the answer is yes, the ACP 125 may prompt the caller to submit the facsimile message in a well-known manner [act 760]. The ACP 125 may deliver the facsimile as a textual message to the user's instant messaging client, if the user is determined to be online and that is the preferred method, or it may deliver the facsimile message to the user's e-mail address as an attachment [act 765]. If the answer to the question "Do you wish to leave a facsimile message for the user?" is no, then the ACP 125 may end the session or ask for other instructions from the caller.

If the caller responds with a positive response to the question "Do you wish to talk to the user?" [act 735], the ACP 125 may query the user's profile information to determine how the user should be contacted [act 810] (FIG. 8). As described above, this profile information may indicate that the user is to be contacted, for a specific time period, via a home telephone number, a cellular telephone number, an instant messaging client, etc. If the profile information indicates that the user is not to be contacted via his/her instant messaging client [act 820], then the ACP 125 may forward the call to its appropriate destination [act 830]. The ACP 125 may determine the destination, for example, by comparing the current day of the week and time of day with the information stored in the database 401 (FIG. 4B). The ACP 125 may then transfer the call to the appropriate communication device as identified by the information stored in the destination field 490.

If the ACP 125 determines that the user should be contacted via his/her instant messaging client [act 820], the ACP 125 may determine an alias associated with the user [act 840]. The ACP 125 may determine the correct user alias by using the telephone number and/or PIN provided by the caller at the onset of the session. The ACP 125 may query the database 140 to determine the user's alias by comparing the caller provided information with the information in the database 140. The ACP 125 may then determine if the user is currently online [act 850]. To make this determination, the ACP 125 may query the database 140 and retrieve the information provided by the user in act 710 (FIG. 7). If it is determined that the user is not currently online, then the ACP 125 may prompt the caller to leave a voicemail message or facsimile message for the user [act 740 or 755] (FIG. 7).

If it is determined that the user is online, then the ACP 125 may retrieve all user information associated with the user's alias [act 860]. As illustrated in FIG. 4A, this information may include the IM user ID stored in IM user ID field 440, the instant messaging application type stored in the IM application field 445, the instant messaging version number stored in IM version field 450, and the current network address stored in the current network address field 455.

If the instant messaging client version allows text and/or voice messaging, the ACP 125 may send an instant message (text and/or voice) to the user indicating that an incoming call is available, and supplying the caller's identification if it is available [act 870]. This message may be sent over network 150 to the user's instant messaging client. The user may then be prompted with the question "Do you wish to receive the incoming call from the caller?" [act 880]. The user may, for example, be requested to respond by typing "yes" or "no" into a graphical user interface (GUI) supplied by the ACP 125. If the user responds negatively to the question, the ACP 125 may route the call to an alternate destination (e.g., voicemail or other voice or data destinations).

If the user responds that he/she wishes to accept the incoming call, then the ACP 125 may connect the caller with a network telephony gateway 130 [act 910] (FIG. 9). The network telephony gateway 130 may translate the voice signal from the PSTN 120 to a data packet format, and vice versa, in a well-known manner. The network telephony gateway 130 may then connect the caller to the user's instant messaging voice client [act 920]. The network telephony gateway 130 may connect with the user device 160 over the network 150. The user's instant messaging client may then receive the incoming telephone call from the caller. The communication session between caller and user may now take place [act 930]. The user may remain connected to his/her Internet service provider or intranet connection, and may navigate through web pages throughout the network 150 while conversing with the caller. In addition, the number of concurrent incoming calls is limited only by the available bandwidth and characteristics of the user's instant messaging client. After at least one party breaks the communication link, then the ACP 125 may terminate the communication session [act 940]. The ACP 125 may notify the user device 160 that the communication session has ended.

The aforementioned acts describe one implementation, consistent with the present invention, in which PSTN to instant messaging client communications is made possible. Routing of calls from an automated call processor 125 to a network telephony gateway 130, then to a user's instant messaging client allows a user to receive an incoming call at any location, and via a predefined single telephone number, at which he/she has an Internet connection. This feature is possible due to the use of the user's instant messaging ID and current network address in routing the call and locating the user.

CONCLUSION

Systems and methods, consistent with the present invention, provide a mechanism by which communications may be established between a caller on a public switched telephone network and a user via his/her instant messaging client. Establishment and maintenance of the communication channel between the caller and user is handled by an automated call processor. The user information and current network address is maintained by a server with an associated database.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above-described processing is directed to a caller using a telephone device connected to a public switched telephone network, it will be appreciated that the present invention is equally applicable to a caller using a computer connected to a network, such as the Internet, an intranet, a WAN, a LAN, or the like. In such an implementation, the caller may contact the user via an e-mail address, and the automated call processor may identify the user through his/her unique e-mail address and manage the voice communication session.

While series of acts have been described with regard to FIGS. 6–9, the order of the acts may be varied in other implementations consistent with the present invention. No element, act, or instruction used in the description of the present application should be construed as critical or essential to the invention unless explicitly described as such.

The scope of the invention is defined by the claims and their equivalents.

What is claimed is:

1. A method for establishing a telephone call between a calling party and a called party, comprising:

receiving a telephone call connection request from the calling party; and establishing the telephone call, via an instant messaging client, as an end-to-end voice call, without selection by the called party for call establishment effected through the instant messaging client, if the called party is connected to a data network.

2. The method of claim 1 wherein the receiving includes:

receiving the telephone call connection request via a public switched telephone network.

3. The method of claim 1 further comprising:

retrieving a current network address of the called party, and wherein the establishing includes:

establishing the telephone call using the current network address.

4. The method of claim 1 further comprising:

determining, based on profile information associated with the called party, a destination to route the telephone call when the called party is not connected to the data network; and routing the telephone call to the destination.

5. The method of claim 1 wherein the establishing includes:

prompting the calling party to leave a voice message when the called party is not connected to the data network, and delivering the voice message to an e-mail account or instant messaging client associated with the called party.

6. The method of claim 1 wherein the establishing includes:

prompting the calling party to leave a facsimile message when the called party is not connected to the data network, and delivering the facsimile message to an e-mail account or instant messaging client associated with the called party.

7. The method of claim 1 wherein the establishing includes:

retrieving a profile associated with the called party based on an identification information specific to the called party, and examining the profile to determine how to route the telephone call.

8. The method of claim 1 wherein the establishing includes:

prompting the called party as to whether to accept the telephone call, and routing the telephone call to an alternate destination when the telephone call is not accepted.

9. The method of claim 8 wherein the routing includes:

prompting the calling party to leave a voice message for the called party, recording the voice message, determining the alternate destination based on a profile associated with the called party, and routing the voice message to the alternate destination.

10. The method of claim 9 wherein the alternate destination includes one of an e-mail account of the called party and the instant messaging client.

11. The method of claim 1 wherein the establishing includes:

determining an instant messaging version number of the instant messaging client of the called party, and routing the telephone call to called party based on the instant messaging version number.

12. A system for establishing a telephone call between a calling party and a called party, comprising:

a server configured to store profile information associated with the called party; and an automated call processor configured to receive a telephone call connection request from a calling party, determine if the called party is currently connected to a data network based on the profile information, and establish the telephone call, via an instant messaging client, as an end-to-end voice call without selection by the called party for call establishment effected through the instant messaging client, if the called party is connected to the data network.

13. The system of claim 12 wherein the automatic call processor is further configured to:

determine, based on the profile information, a destination to route the telephone call when the called party is not connected to the data network, and routing the telephone call to the destination.

14. The system of claim 12 wherein the automated call processor is further configured to:

prompt the calling party to leave a voice or facsimile message when the called party is not connected to the data network, and route the voice or facsimile message to one of an e-mail account and instant messaging client of the called party.

15. The system of claim 12 wherein automated call processor is further configured to:

determine an instant messaging version number of the instant messaging client, and route the telephone call to the called party based on the instant messaging version number.

16. The system of claim 12 wherein the automated call processor receives the telephone call connection request from a public switched telephone network.

17. The system of claim 12 wherein the automated call processor is further configured to:

retrieve a current network address of the called party, and wherein, when establishing, the automated call processor is configured to: establish the telephone call using the current network address.

18. The system of claim 12 wherein the profile information includes one or more of an instant messaging identifier, a telephone number, and a current network address.

19. The system of claim 18 wherein the profile information further includes at least one of one or more time ranges, one or more dates or range of dates, and destination information.

20. A computer-readable medium that stores instructions executable by at least one processor to perform a method for establishing a telephone call between a calling party and a called party, comprising:

instructions for receiving a telephone connection request from at least one calling party; and instructions for connecting the at least one calling party with the called party, via an instant messaging client, as an end-to-end voice call, without selection by the called party for call establishment effected through the instant messaging client, if the called party is available on the data network.

21. A method for routing a voice call to a called party, comprising:

receiving a call connection request, including identification information specific to the called party, from a calling party to establish the voice call via an instant messaging client, without selection by the called party for call establishment effected through the instant messaging client, if the called party is connected to the instant messaging client;

obtaining, based on the identification information, an instant messaging user identification corresponding to the instant messaging client; and routing the voice call to the called party based on the instant messaging user identification.

22. The method of claim 21 wherein the receiving includes:

receiving the telephone call connection request via a public switched telephone network.

23. The method of claim 21 further comprising:

determining an instant messaging version number of the instant messaging client; and establishing the telephone call between the calling party and the called party based on the instant messaging version number.

24. The method of claim 21 further comprising:

determining, based on profile information associated with the called party, a destination to route the telephone call when the called party is not available on the network; and routing the telephone call to the destination.

25. The method of claim 24 wherein the profile information includes one or more time ranges and one or more dates or range of dates.

* * * * *